(12) United States Patent
Roach et al.

(10) Patent No.: US 9,085,348 B1
(45) Date of Patent: Jul. 21, 2015

(54) VARIABLE WEFT WEBBING FOR USE AS SUPERPRESSURE ENVELOPE LOAD TENDON

(71) Applicant: Google Inc., Mountain View, CA (US)

(72) Inventors: Kevin Roach, Boulder Creek, CA (US); Jeffrey Neri, Gardnerville, NV (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/283,946

(22) Filed: May 21, 2014

Related U.S. Application Data (60) Provisional application No. 61/918,882, filed on Dec. 20, 2013, provisional application No. 61/918,894, filed on Dec. 20, 2013.

(51) Int. Cl.
*B64B 1/14* (2006.01)
*B64B 1/58* (2006.01)
*D03D 1/02* (2006.01)

(52) U.S. Cl.
CPC ... *B64B 1/58* (2013.01); *D03D 1/02* (2013.01)

(58) Field of Classification Search
None
See application file for complete search history.

(56) References Cited

U.S. PATENT DOCUMENTS

| | | | |
|---|---|---|---|
| 2,679,224 A | | 5/1954 | Sturtevant |
| 2,858,090 A | * | 10/1958 | Winzen et al. ............... 244/31 |
| 2,919,082 A | | 12/1959 | Winzen et al. |
| 2,960,282 A | * | 11/1960 | Winzen ........................ 244/31 |
| 3,311,328 A | * | 3/1967 | Slater ........................... 244/31 |
| 3,534,927 A | * | 10/1970 | Harding ....................... 244/31 |
| 3,616,569 A | * | 11/1971 | Litt et al. ...................... 46/220 |
| 4,113,206 A | * | 9/1978 | Wheeler ....................... 244/31 |
| 4,117,993 A | * | 10/1978 | Palm et al. .................. 244/145 |
| 4,390,149 A | * | 6/1983 | Barnes et al. ................ 244/31 |
| 4,434,958 A | | 3/1984 | Rougeron et al. |
| 4,529,153 A | * | 7/1985 | Conn .......................... 244/126 |
| 4,750,690 A | * | 6/1988 | Conn .......................... 244/126 |
| 6,655,206 B1 | * | 12/2003 | Barat ....................... 73/170.01 |
| 7,469,857 B2 | * | 12/2008 | Voss ............................. 244/97 |
| 7,611,395 B2 | * | 11/2009 | Bonsembiante ............ 446/220 |
| 2003/0062444 A1 | * | 4/2003 | Goodey ........................ 244/24 |
| 2012/0031119 A1 | * | 2/2012 | Ahmad et al. .................. 62/79 |
| 2014/0360660 A1 | * | 12/2014 | Latham et al. .............. 156/269 |

OTHER PUBLICATIONS

A. L. Morris. "Scientific Ballooning Handbook." NCAR Technical Note. Atmospheric Technology Division, National Center for Atmospheric Research. May 1975, 258 pages.

X. Deng. "Clefted Equilibrium Shapes of Superpressure Balloon Structures." California Institute of Technology, Pasadena, California. © 2012, 158 pages. Retrieved from: <http://thesis.library.caltech.edu/7141/>.

\* cited by examiner

*Primary Examiner* — Christopher P Ellis
*Assistant Examiner* — Medhat Badawi
(74) *Attorney, Agent, or Firm* — Lerner, David, Littenberg, Krumholz & Mentlik, LLP (57) ABSTRACT

A tendon is provided for supporting a balloon having a balloon envelope. The tendon has first and second end portions that are configured to be secured to sections of the balloon envelope and a main body portion disposed between the ends. The main body portion is configured to support a load caused by inflating the balloon envelope. The first end, second end and main body portions are formed from a plurality of weft and warp fibers disposed as webbing. The warp fibers extend longitudinally through the webbing and the weft fibers extend threadedly from side to side through the warp fibers. An elasticity of the tendon is adjusted by configuring the weft fibers along a particular weft path so as to be spaced apart in the main body portion at a certain distance from each other that is different than a spacing of the weft fibers in the ends.

20 Claims, 6 Drawing Sheets

VARIABLE WEFT WEBBING FOR USE AS SUPERPRESSURE ENVELOPE LOAD TENDON

CROSS-REFERENCE TO RELATED APPLICATIONS

The present application claims the benefit of the filing date of U.S. Provisional Patent Application No. 61/918,894 filed Dec. 20, 2013 and claims the benefit of the filing date of U.S. Provisional Patent Application No. 61/918,882 filed Dec. 20, 2013, the disclosures of which are hereby incorporated herein by reference.

BACKGROUND

Computing devices such as personal computers, laptop computers, tablet computers, cellular phones, and countless types of Internet-capable devices are increasingly prevalent in numerous aspects of modem life. As such, the demand for data connectivity via the Internet, cellular data networks, and other such networks, is growing. However, there are many areas of the world where data connectivity is still unavailable, or if available, is unreliable and/or costly. Accordingly, additional network infrastructure is desirable.

Some systems may provide network access via a balloon network operating in the stratosphere. Because of the various forces experienced by these balloons during deployment and operation, there is a balancing of needs between flexibility and stability of materials. The balloons may be made of more flexible envelope material configured in sections or lobes to create a "pumpkin" or lobed balloon. The lobes may be supported by a plurality of tendon structures.

Typically, a certain amount of stretch in the tendons can have a negative effect on the stability of the balloon. For example, if the tendons excessively stretch while the balloon is in the air, they can cause the balloon to become unstable.

BRIEF SUMMARY

Aspects of the disclosure provide a tendon for supporting a balloon that has a balloon envelope. The tendon includes first and second end portions and a main body portion disposed between the first and second end portions. The first and second end portions are configured to be secured to sections of the balloon envelope. The main body portion is configured to loop over the balloon envelope along an axis of the balloon in order to support a load caused by inflating the balloon envelope. The first, second and the main body portion are formed from a plurality of weft and warp fibers disposed as webbing. In this regard, the warp fibers extend longitudinally through the webbing while the weft fibers extend threadedly from side to side through one or more of the warp fibers. An elasticity of the main body portion is adjusted by configuring the weft fibers along a particular weft path so as to be spaced apart in the main body portion at a certain distance from each other. This certain distance is different than a spacing of the weft fibers in the first and second end portions.

In another aspect, a system is provided. The system includes a balloon that has a balloon envelope, a payload attached to the balloon and a plurality of tendons. Each tendon includes first and second end portions and a main body portion disposed between the first and second end portions. The first and second end portions are configured to be secured to sections of the balloon envelope. The main body portion is configured to loop over the balloon envelope along an axis of the balloon in order to support a load caused by inflating the balloon envelope. The first, second and the main body portion are formed from a plurality of weft and warp fibers disposed as webbing. The warp fibers extend longitudinally through the webbing while the weft fibers extend threadedly from side to side through one or more of the warp fibers. An elasticity of the middle portion is adjusted by configuring the weft fibers along a particular weft path so as to be spaced apart in the main body portion at a certain distance from each other. This certain distance is different than a spacing of the weft fibers in the first and second end portions.

In yet another aspect, a method of manufacturing a tendon for supporting a balloon that has a balloon envelope is provided. The tendon includes first and second end portions, a main body portion disposed between the first and second end portions and a plurality of weft and warp fibers disposed as webbing. The method includes receiving the weft and warp fibers at a manufacturing device. The warp fibers are configured to extend longitudinally through the webbing. Using the manufacturing device, the weft fibers are fed threadedly from side to side through one or more of the warp fibers. The weft fibers are feed at an adjustable uptake rate along a particular weft path. Uptake rate for feeding the weft fibers is adjusted in order to configure an elasticity of the middle portion of the webbing. Based on this adjustment, the weft fibers in the main body portion are spaced apart at a certain distance from each other that is different than a spacing of the weft fibers in the first and second end portions.

DETAILED DESCRIPTION

Aspects, features and advantages of the disclosure will be appreciated when considered with reference to the following description of embodiments and accompanying figures. The same reference numbers in different drawings may identify the same or similar elements. Furthermore, the following description is not limiting; the scope of the present technology is defined by the appended claims and equivalents. While certain processes in accordance with example embodiments are shown in the figures as occurring in a linear fashion, this is not a requirement unless expressly stated herein. Different processes may be performed in a different order or concurrently. Steps may also be added or omitted unless otherwise stated.

The present disclosure relates generally to providing a tendon for supporting a structure, such as a high-altitude balloon having a balloon envelope. The tendon is comprised of webbing that has a configurable elasticity. For example, by manufacturing the webbing so that it has a majority of straight warp fibers and a minimal amount of fill weft fibers in certain load bearing portions, it is possible to create a lightweight, low-cost tendon that has an optimized amount of stretch and strength. This allows the tendon to effectively support the balloon during flight.

As an example, the tendon for supporting the balloon structure has two ends, e.g., one end at an upper portion of the tendon and the other at a lower portion, and a main body or middle portion resting between the two end portions. The two ends are configured to be secured to other structures of the balloon. The main body portion is configured to loop over the balloon envelope along a vertical axis of the balloon in order to support a load caused by inflating the balloon envelope. The first, second and main body portions are formed from a plurality of weft and warp fibers disposed as a webbing. In this regard, the warp fibers extend longitudinally through the webbing and the weft fibers extend threadedly from side to side through one or more of the warp fibers. An elasticity of the tendon can be adjusted by configuring the weft fibers along a particular weft path so as to be spaced apart in the main body portion at a certain distance from each other. This spacing is different than a spacing of the weft fibers in the end portions of the tendon.

Various techniques may be implemented for manufacturing this type of tendon comprised of webbing. As an example, one method includes receiving the weft and warp fibers at a manufacturing device, such as a weaving loom. In this example, the warp fibers extend longitudinally through the webbing. Using the manufacturing device, the weft fibers are threadedly fed from side to side through one or more of the of warp fibers. These weft fibers are feed at an adjustable uptake rate along a particular weft path. The uptake rate for feeding the weft fibers is adjusted, e.g., at a variable speed in order to space the fibers apart in the main body portion of the webbing at a certain distance from each other that is different than a spacing of the weft fibers in the end portions of the webbing. Once the tendons have been manufactured, they can be attached to the balloon, for example, to support the balloon structure.

Example System

Figure 1:
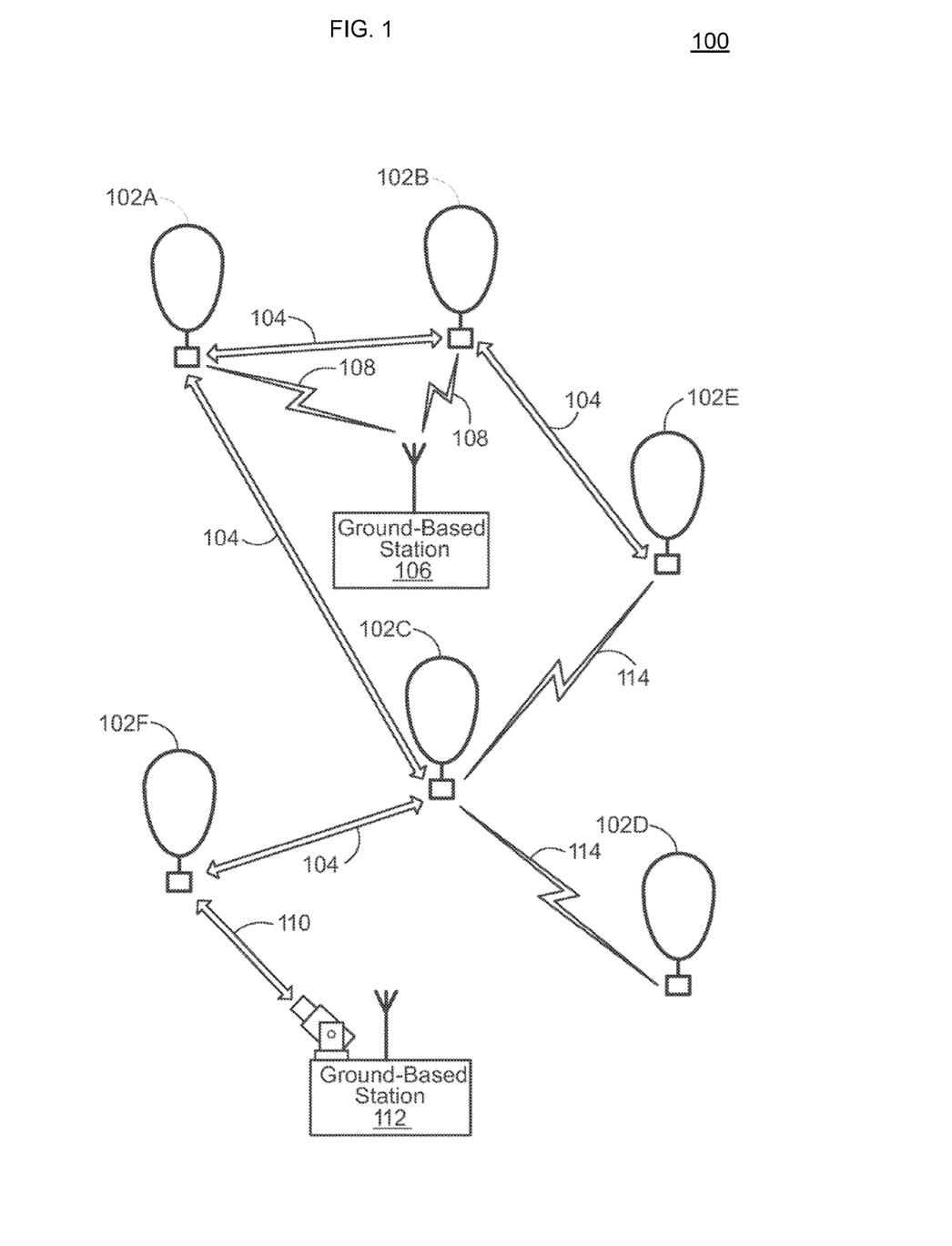
FIG. 1 is a functional diagram of a system in accordance with aspects of the present disclosure.

FIG. 1 depicts an example system 100 in which the balloons as described above may be used. This example should not be considered as limiting the scope of the disclosure or usefulness of the features described herein. System 100 may be considered a "balloon network." In this example, balloon network 100 includes a plurality of devices, such as of balloons 102A-F as well as ground base stations 106 and 112. Balloon network 100 may also include a plurality of additional devices, such as various computing devices (not shown) as discussed in more detail below.

As shown, the devices of system 100 are configured to communicate with one another. As an example, the balloons may include free-space optical links 104 and/or radiofrequency (RF) links 114 in order to facilitate intra-balloon communications. In this way, balloons 102A-F may collectively function as a mesh network for packet data communications. Further, at least some of balloons 102A-B may be configured for RF communications with ground-based stations 106 and 112 via respective RF links 108. Some balloons, such as balloon 102F, could be configured to communicate via optical link 110 with ground-based station 112.

As noted above, to transmit data to another balloon, a given balloon 102 may be configured to transmit an optical signal via an optical link 104. In addition, the given balloon 102 may use one or more high-power light-emitting diodes (LEDs) to transmit an optical signal. Alternatively, some or all of the balloons may include laser systems for free-space optical communications over the optical links 104. Other types of free-space optical communication are possible. Further, in order to receive an optical signal from another balloon via an optical link 104, a given balloon may include one or more optical receivers. Additional details of the balloons are discussed in greater detail below, with reference to FIG. 2.

Balloons in the network 100 may also utilize different RF air-interface protocols for communication with ground-based stations via respective RF links. For example, some or all of the balloons 102A-F may be configured to communicate with ground-based stations 106 and 112 via RF links 108 using various protocols described in IEEE 802.11 (including any of the IEEE 802.11 revisions), cellular protocols such as GSM, CDMA, UMTS, EV-DO, WiMAX, and/or LTE, and/or one or more propriety protocols developed for balloon-ground RF communication, among other possibilities.

In some examples, the RF links may not provide a desired link capacity for balloon-to-ground communications. For instance, increased capacity may be desirable to provide backhaul links from a ground-based gateway. Accordingly, an example network may also include downlink balloons, which could provide a high-capacity air-ground link between the various balloons of the network and the ground-base stations. For example, in balloon network 100, balloon 102F may be configured as a downlink balloon. Like other balloons in network 100, downlink balloon 102F may be operable for optical communication with other balloons via optical links 104. However, downlink balloon 102F may also be configured for free-space optical communication with ground-based station 112 via an optical link 110. Optical link 110 may therefore serve as a high-capacity link (as compared to an RF link 108) between the balloon network 100 and the ground-based station 112. Downlink balloon 102F may additionally be operable for RF communication with ground-based stations 106. In other cases, downlink balloon 102F may only use an optical link for balloon-to-ground communications. Further, while the arrangement shown in FIG. 1 includes just one downlink balloon 102F, an example balloon network can also include multiple downlink balloons. Alternatively, a balloon network can also be implemented without any downlink balloons.

A downlink balloon may be equipped with a specialized, high bandwidth RF communication system for balloon-to-ground communications, instead of, or in addition to, a free-space optical communication system. The high-bandwidth RF communication system may take the form of an ultra-wideband system, which may provide an RF link with substantially the same capacity as one of the optical links 104.

In a further aspect, some or all of balloons 102A-F could be configured to establish a communication link with space-based satellites in addition to, or as an alternative to, a ground-based communication link. In some embodiments, a balloon may communicate with a satellite via an optical link. However, other types of satellite communications are possible.

The balloons 102A-F may collectively function as a mesh network. More specifically, since balloons 102A-F may communicate with one another using free-space optical links, the balloons may collectively function as a free-space optical mesh network. In a mesh-network configuration, each balloon may function as a node of the mesh network, which is operable to receive data directed to it and to route data to other balloons. As such, data may be routed from a source balloon to a destination balloon by determining an appropriate sequence of optical links between the source balloon and the destination balloon. These optical links may be collectively referred to as a "lightpath" for the connection between the source and destination balloons. Further, each of the optical links may be referred to as a "hop" on the lightpath.

The network topology may change as the balloons move relative to one another and/or relative to the ground. Accordingly, balloon network 100 may apply a mesh protocol to update the state of the network as the topology of the network changes. For example, to address the mobility of the balloons 102A to 102F, balloon network 100 may employ and/or adapt various techniques that are employed in mobile ad hoc networks (MANETs). Other examples are possible as well.

The balloon network may be configured as a "transparent" mesh network, as an "opaque" mesh network, or both. In a transparent balloon network, the balloons may include components for physical switching that is entirely optical, without any electrical components involved in the physical routing of optical signals. Thus, in a transparent configuration with optical switching the signals travel through a multi-hop lightpath that is entirely optical. In an opaque configuration, some or all of the balloons may use optical-electrical-optical (OEO) switching. For example, some or all balloons may include optical cross-connects (OXCs) for OEO conversion of optical signals.

Balloon network 100 may also implement station-keeping functions to help provide a desired network topology. For example, station keeping may involve each balloon 102 maintaining and/or moving into a certain position relative to one or more other balloons in the network (and possibly into a certain position relative to the ground). As part of this process, each balloon may implement station-keeping functions to determine its desired positioning within the desired topology, and if necessary, to determine how to move to the desired position.

The desired topology may vary depending upon the particular implementation and whether or not the balloons are continuously moving. In some cases, balloons may implement station keeping in order to provide a substantially uniform topology where the balloons function to position themselves at substantially the same distance (or within a certain range of distances) from adjacent balloons in the balloon network 100. Alternatively, balloon network 100 may have a non-uniform topology where balloons are distributed more or less densely in certain areas, for various reasons.

As an example, to help meet the higher bandwidth demands, balloons may be clustered more densely over areas with greater demand (such as urban areas) and less densely over areas with lesser demand (such as over large bodies of water). In addition, the topology of an example balloon network may be adaptable allowing balloons to adjust their respective positioning in accordance with a change in the desired topology of the network.

The balloons of balloon network 100 may be high-altitude balloons, which are deployed in the stratosphere. As an example, the balloons may generally be configured to operate at altitudes between 18 km and 25 km above the Earth's surface in order to limit the balloon's exposure to high winds and interference with commercial airline flights. In order for the balloons to provide a reliable mesh network in the stratosphere, where winds may affect the locations of the various balloons in an asymmetrical manner, the balloons may be configured to move latitudinally and/or longitudinally relative to one another by adjusting their respective altitudes, such that the wind carries the respective balloons to the respectively desired locations.

Figure 2:
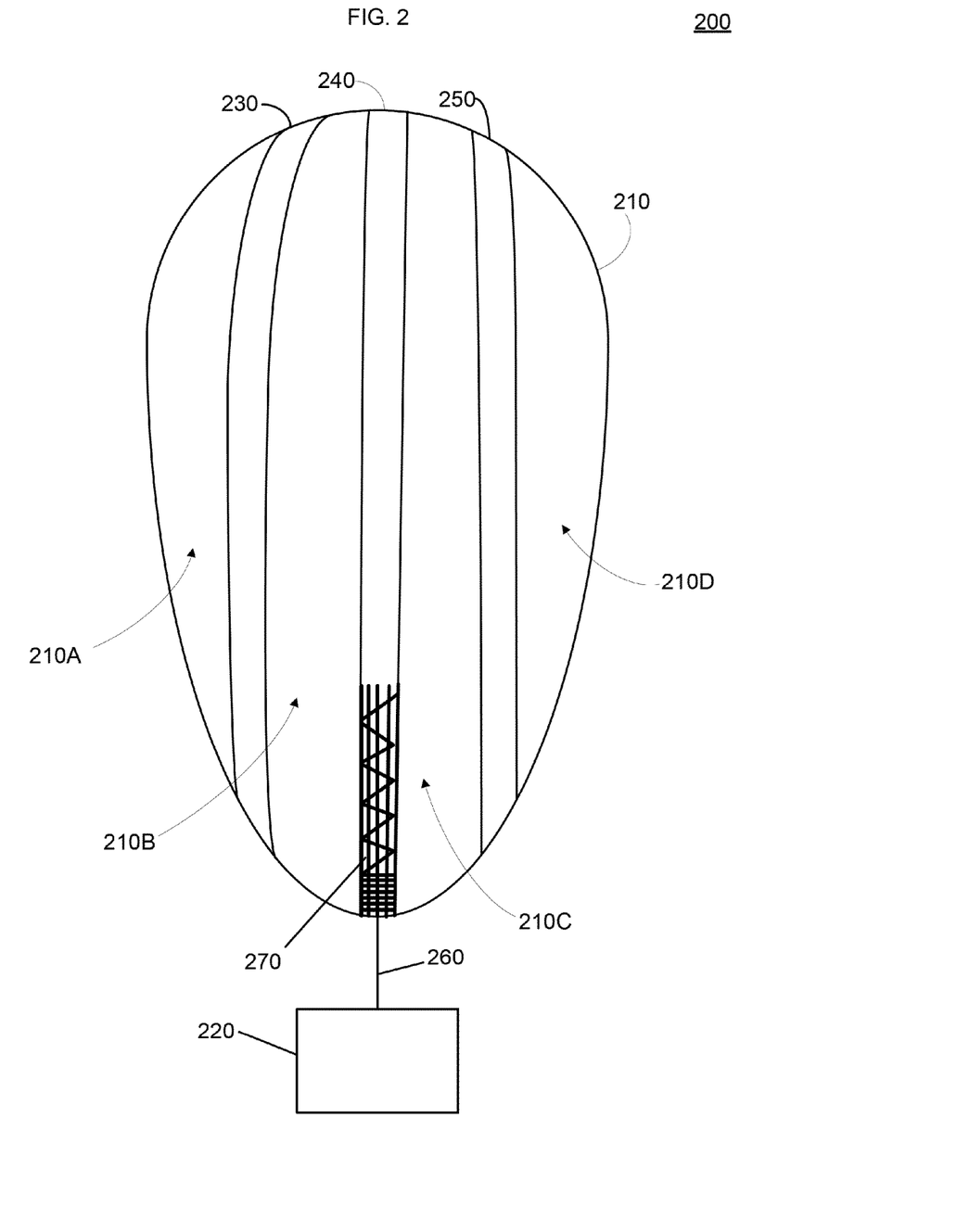
FIG. 2 is an example of a high-altitude balloon in accordance with aspects of the present disclosure.

FIG. 2 is an example high-altitude balloon 200, which may represent any of the balloons of balloon network 100. As shown, the balloon 200 includes an envelope 210, a payload 220 and a plurality of tendons 230-250 attached to the envelope 210.

The high-altitude balloon envelope 210 may take various forms. In one instance, the balloon envelope 210 may be constructed from materials such as polyethylene that do not hold much load while the balloon 200 is floating in the air during flight. Additionally, or alternatively, some or all of envelope 210 may be constructed from a highly flexible latex material or rubber material such as chloroprene. Other materials are also possible. Further, the shape and size of the envelope 210 may vary depending upon the particular implementation. Additionally, the envelope 210 may be filled with various gases or mixtures thereof, such as helium, hydrogen or any other lighter-than-air gas. The envelope 210 is thus arranged to have an associated upward buoyancy force during deployment of the payload 220.

The payload 220 of balloon 200 is affixed to the envelope by a connection 260 such as a cable. The payload 220 may include a computer system (not shown), having one or more processors and on-board data storage. The payload 220 may also include various other types of equipment and systems (not shown) to provide a number of different functions. For example, the payload 220 may include an optical communication system, a navigation system, a positioning system, a lighting system, an altitude control system and a power supply to supply power to various components of balloon 200.

In view of the goal of making the balloon envelope 210 as lightweight as possible, it may be comprised of a plurality of envelope lobes or gores that have a thin film, such as polyethylene or polyethylene terephthalate, which is lightweight, yet has suitable strength properties for use as a balloon envelope deployable in the stratosphere. In this example, balloon envelope 210 is comprised of envelope gores 210A-210D.

The individual envelope gores 210A-210D may be shaped so that the length of the edge seam connecting adjacent envelope gores is greater than the length of a centerline of the envelope gores. Thus, the envelope gores 210A-210D may be shaped to better optimize the strain rate experienced by the balloon envelope 210. The pressurized lifting gas within the balloon envelope 210 may cause a force or load to be applied to the balloon 200.

As noted above, the tendon structures 230-250 may be used to provide strength to the balloon 200 to carrier the load created by the pressurized gas within the balloon envelope 210. In some examples, a cage of tendons (not shown) may be created using multiple tendons that are attached vertically and horizontally. Each tendon may be formed as a fiber load tape that is adhered to a respective envelope gore. Alternately, a tubular sleeve may be adhered to the respective envelopes with the tendon positioned within the tubular sleeve.

The tendon 240 may be looped over a particular envelope gore in order to tack it onto an apparatus that serves as a termination assembly, for example, there may be termination assemblies at a top and bottom of the balloon envelope 210. The termination assembly secures each of the tendons to the overall structure of balloon 200. For example, the termination assembly may include a structure like a type of plate that is configured to receive an end of the tendons. As noted above, incorporated by reference is U.S. Provisional Patent Application No. 61/918,882 filed Dec. 20, 2013, entitled "TENDON WEBBING TERMINATION PLATE FOR SUPERPRESSURE ENVELOPE," which provides examples of different types of assemblies for attaching the tendons.

The tendons may be comprised of webbing. For example, as shown in FIG. 2, the tendon 240 may be comprised of webbing 270. This webbing 270 includes a plurality of warp and weft fibers woven together. In some instances, the fibers may be an ultra-high-molecular-weight polyethylene (UHM-WPE) fiber like dyneema. Other options include other types of UHMWPE fibers known as spectra, tensylon, twaron and possibly others that have low fiber extensibility. The webbing provides a low cost method of creating a bar tack termination point at both ends of the tendons. For example, the webbed ends of the tendon can be attached a termination assembly an either end of the balloon envelope. It is difficult, however, to maintain this low cost characteristic while also reducing an overall stretch and parasitic weight of the webbing. In some aspects, it is possible to customize the weave of the webbing 270 to have an optimum amount of stretch during airborne operation of balloon 200. Further examples of this type webbing are discussed below.

Figure 3:
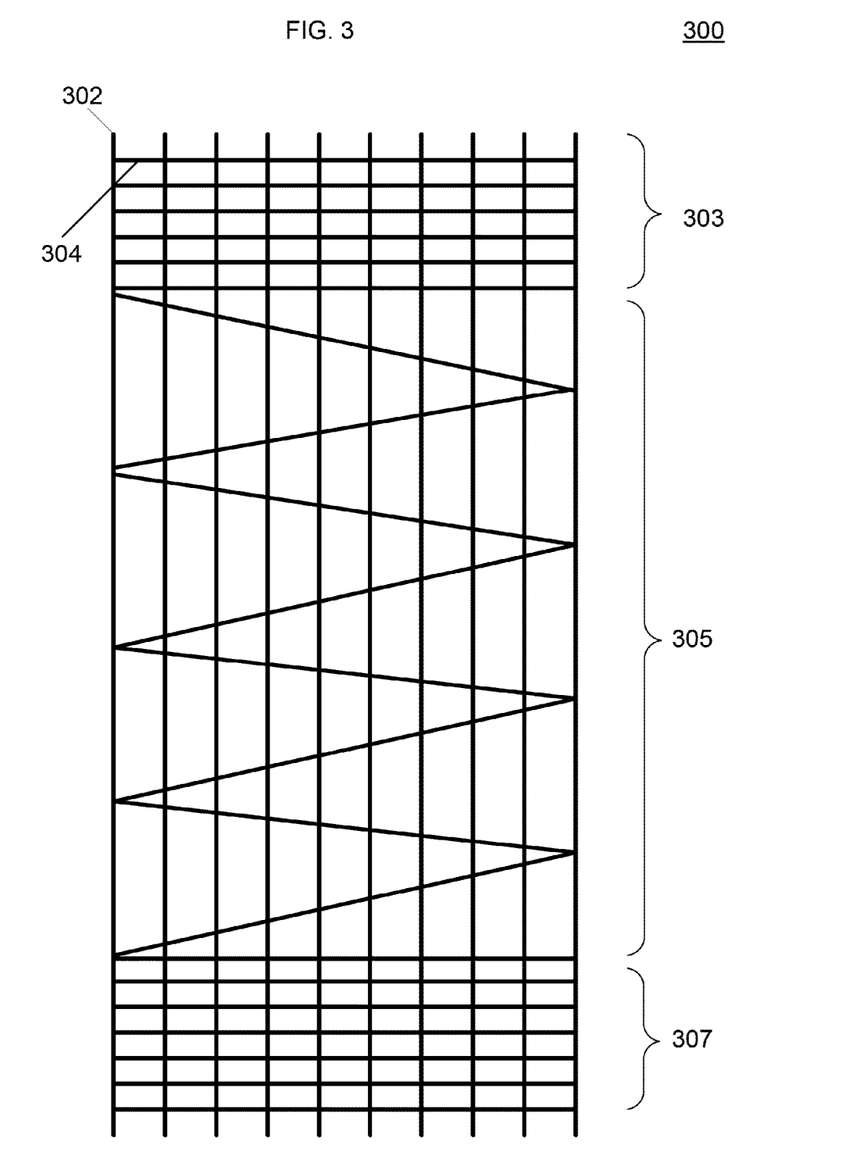
FIG. 3 is an example of a tendon in accordance with aspects of the present disclosure.

With reference to FIG. 3, tendon 300 is shown. As noted above, the tendon 300 may be comprised of webbing that has a plurality of warp fibers 302 and weft fibers 302 woven together in a certain configuration. In a traditional webbing material there is a lot of elongation (e.g., stretch), otherwise called machine elongation due to the cross hatch of warp and weft fibers. For example, where the warp and weft fibers cross there may be a lot of bend in the wrap fibers of webbing causing it to stretch more than it normally would. If the webbing stretches too much, it can have a negative effect on a balloon's stability because the tendons may move far from where they were placed on the balloon envelope.

The altitude at which the high-altitude balloons can reach can cause the webbing 360 to stretch. The stretch or elasticity properties of the webbing 360 can be configured based on the arrangement of warp fibers 302 and weft fibers 304 in the weave. For example, by using a majority of straight warp fibers 302 and a minimal amount of fill weft fibers 304 in certain portions of the webbing, the amount of stretch in the tendon can be optimized to support the balloon envelope.

Here, tendon 300 is partly formed by extending the warp fibers 302 longitudinally through the webbing. The weft fibers 304 are extending threadedly, from side to side, through one or more of the warp fibers 302. In this example, the webbing 360 has two ends which are at an upper portion 303 and a lower portion 307 of tendon 300, and a main body (middle) portion 305. The main body or middle portion 305 is configured to rest between the upper portion 303 and lower portion 307. The fibers are disposed in each portion of the tendon 300.

As shown in FIG. 3, the middle portion 305 is configured to include less fill weft fibers 304 than those in the upper and lower portions 303 and 307. In this manner, the stretch of the tendon 300 will correspond to the elongation properties of the longitudinally extending warp fibers 302 rather than the blended properties of the crosshatch fibers. For example, the middle portion 305 of the webbing 360 may be a load bearing section that is used to support the balloon when the tendons are attached. This means that the middle portion 305 may be positioned on the balloon so as to endure greater forces than the other portions of the webbing 302 during the balloon's flight.

Figure 4:
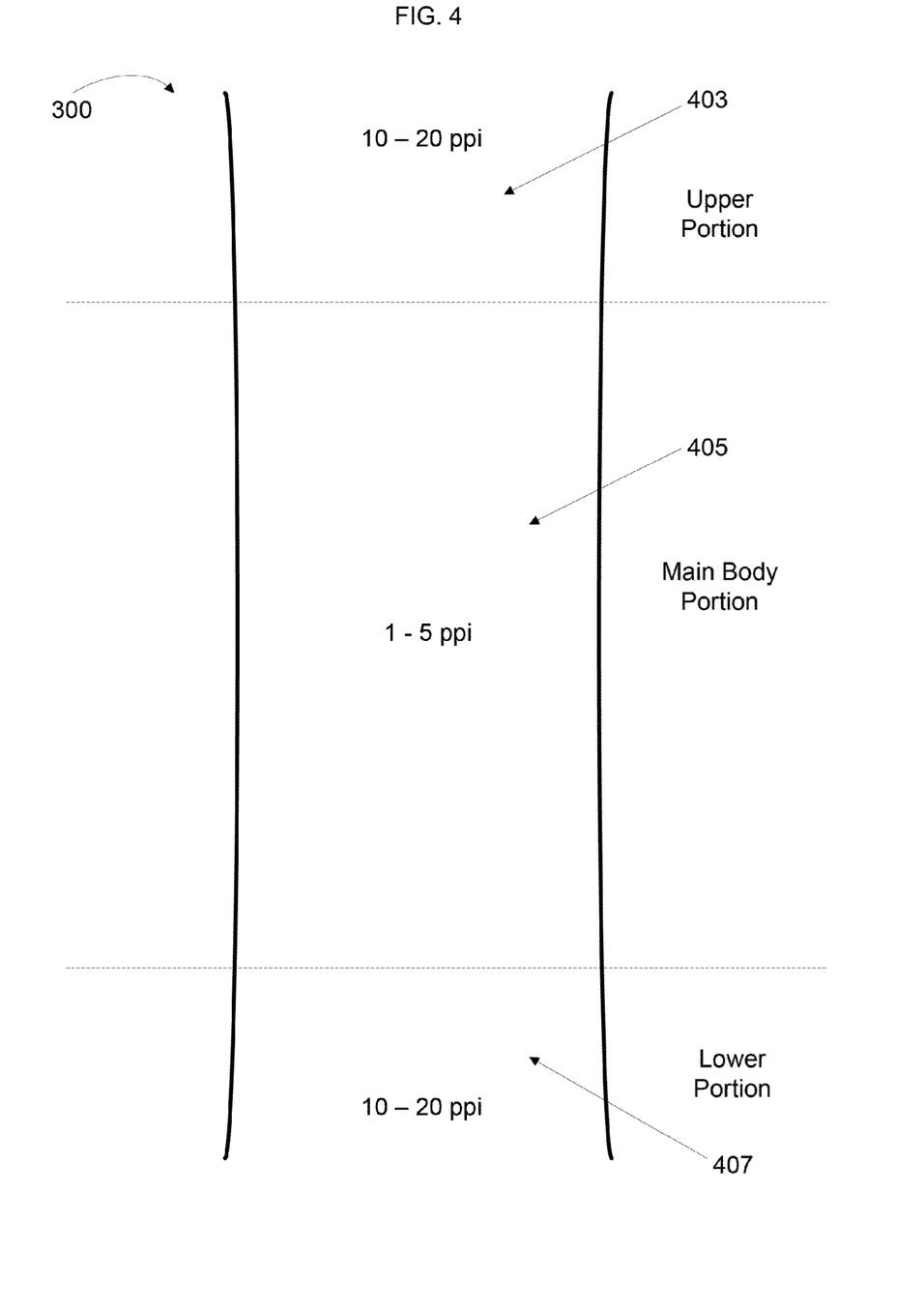
FIG. 4 is another view of the tendon in FIG. 3 in accordance with aspects of the present disclosure.

FIG. 4 is a perspective view 400 of the tendon 300 in FIG. 3. As shown, upper portion 403 and lower portion 407 are configured at each end of the tendon 300, while main body (middle) portion 405 rests between the two ends. As noted above, the tendon 300 includes a custom weave of warp and weft fibers, which can determine the overall stretch properties of the tendon 300.

In an example configuration according to aspects of the disclosure, each portion of tendon 300 may be of a certain length. For example, the upper portion 403 may have a length between 1 and 8 inches stretching lengthwise with respect to longitudinally axis of a balloon. The lower portion 407 may correspond to the upper portion 403 in that it may be configured at a corresponding length. The upper and lower portions 403 and 407 are configured as termination points for tendon 300. For example, these termination points may indicate at end of the tendon 300 that can be attached to a termination assembly, e.g., a ring plate.

The middle body portion 405 is the longest part of the tendon 400. It may be some particular length (e.g., approximately 18 meters), which is needed to support the balloon. For example, to assemble a balloon, the middle body portion 405 may be used to support a load caused by inflating the balloon envelope. As such, the middle body portion 405 should be configured to be long enough so that it can traverse the length of the balloon envelope when inflated in order to be secured at either end of the enveloped.

As discussed above, each section of tendon 300 includes webbing that is filled with a plurality of warp and weft fibers woven together. Each of these sections may be manufactured in a particular manner so that the elongation priorities of the webbing can satisfy the amount of stretch needed to support an inflated balloon envelope. For example, based on empirical data, a horizontal fill direction of weft fibers in the upper portion 403 and lower portion may meet a certain range of picks per inch (ppi), such as a range of 10-20 ppi. In the main body portion 405, the fill direction of weft fibers will be in a reduced range than that of the other portions. For example, the horizontally threaded weft fibers used to fill in the main body portion 405 may be within a range of 1-5 ppi (e.g., 2.5 ppi).

An advantage of this particular configuration is that it allows the webbing to mostly stretch in one direction that corresponds to the direction of the warp fibers. In a standard weave, the elongation stretch is typically about 5%, but by using the techniques described herein this stretch can be reduced to approximately 2%. For example, if the vertically aligned warp fibers do not have to weave up and down due to a reduction in the amount of horizontal weft fibers, then there will be a percentage reduction in the overall elongation of the tendon. Another advantage is that it reduces the time and cost for making a tendon by reducing the amount of excess material required, which can be rather expensive. It also sheds extra weight because less fiber is used to manufacture each tendon.

Figure 5:
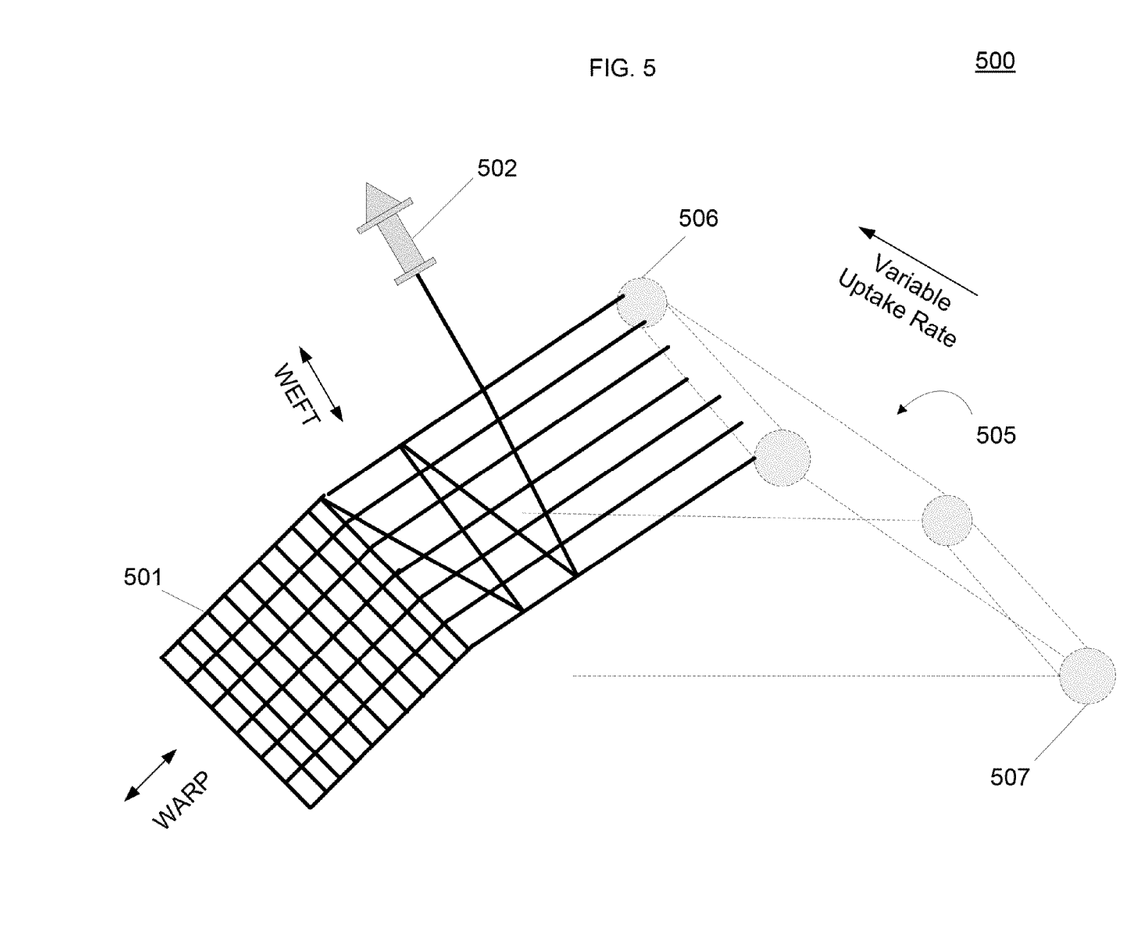
FIG. 5 is an example of system for manufacturing a tendon in accordance with aspects of the present disclosure.

FIG. 5 is an example of a system 500 for manufacturing a tendon 501 that is comprised of a particular webbing, such as the tendons described above with respect to FIGS. 2-4. The system includes a manufacturing device 505. For instance, the manufacturing device 505 may be chosen from different types of devices used for weaving material together, such as a weaving loom. Here, the manufacturing device 505 includes a shuttle 502 for weaving material. The manufacturing device 505 may be configured to move material through the device. For example, the device 502 may include one or more loom rolls, such as rolls 506 and 507.

During the weaving process, the shuttle 502 picks off a length of the weft thread to perform what is known as a pick by threadedly passing the weft thread through several of the warp fibers. This process is repeated over and over again along a certain weft path in order to provide a particular number of picks per given inch (ppi) of wrap fibers. As discussed above, the tendon 501 is configured so that the ppi count in different portions of the tendon varies. For example, the tendon 501 may have a main body portion that has significantly less ppi count than an upper and lower portion of the tendon 501.

To customize the different portions of the webbing, the manufacturing device 505 may be configured to adjust the rate of speed at which material is moving through the device. For instance, the device 505 may include a mechanical arrangement (not shown), such as a motor or manually gears, which can alter the weaving process to provide a different number of picks for a given length of woven material. In this example, the mechanical arrangement can be employed by a user to adjust an uptake rate of weft thread fed during each pick by altering the rate of speed at which warp fibers are moving through device 505. For example, by increasing the rate of speed at which warp fibers are moving through the device 505, the weft fibers threaded through the warp fibers are spaced further apart. Conversely, by reducing the rate of speed, the weft fibers may be spaced closer together. Thus, the user may employ the mechanical arrangement to increase or decrease the ppi in specific portions of the tendon 501.

Example Method

Techniques for manufacturing a tendon as discussed herein, for example, using the manufacturing device from system 500, will now be described. As noted above, the following operations do not have to be performed in the precise order described below. Rather, as mentioned above, various operations can be handled in a different order or simultaneously, and operations may be added or omitted.

Figure 6:
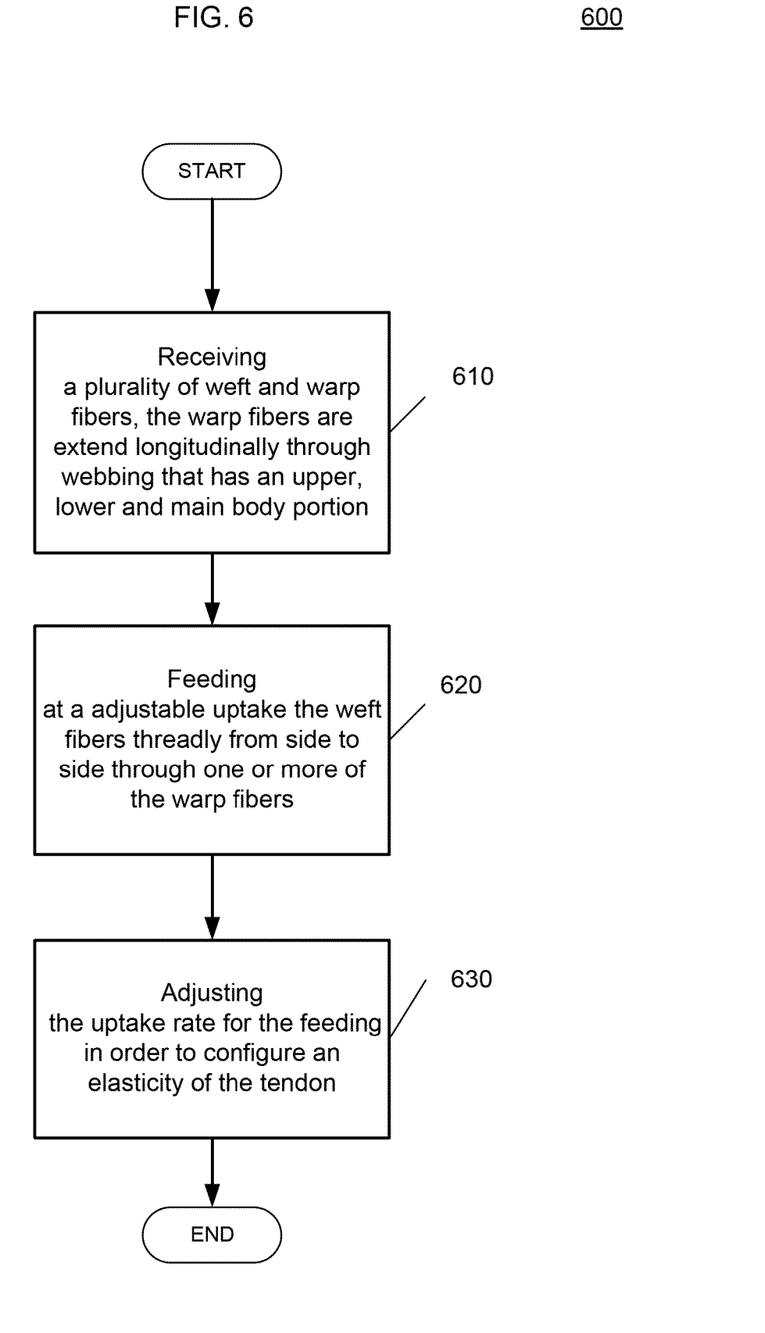
FIG. 6 is an example of a method of manufacturing a tendon in accordance with aspects of the present disclosure.

FIG. 6 is an example of a method 600 of manufacturing a tendon for supporting a balloon. In this example, the tendon is comprised of webbing that has an upper, lower and main body portion. At block 610, a plurality of weft and warp fibers is received. For example, the fibers may be received at a manufacturing device, such as a weaving loom. The warp fibers extend longitudinally through webbing when positioned on the manufacturing device.

At block 620, the weft fibers are feed at an adjustable uptake rate threadedly from side to side through one or more of the warp fibers. For example, the manufacturing device may include a shuttle that picks off a length of the weft thread to perform a pick with the warp fibers. The manufacturing device may include a mechanical arrangement that can be used to adjust an uptake rate of weft fibers fed during each pick by moving the wrap fibers at a variable rate of speed.

At block 630, the uptake rate for feeding the weft fibers is adjusted in order to configure an elasticity of the tendon. For example, the mechanical arrangement may be employed to either increase or decrease the speed of the wrap fibers moving through the manufacturing device. These adjustments may be used to space apart the weft fibers in the main body portion of the tendon at a certain distance from each other. For example, the weft fibers used to fill in the main body portion may be feed within a range of 1-5 ppi (e.g., 2.5 ppi). The spacing in this portion is different than a spacing of weft fibers in the other portions of the tendon, such as the upper and lower portions. For example, the weft fibers in the upper and lower portion of the tendon may be within a range of 10-20 ppi. Thereafter, the custom woven tendon made using method 600 may be used as a lightweight lost-cost support for envelopes of a high-altitude balloon.

Most of the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. As an example, the preceding operations do not have to be performed in the precise order described above. Rather, various steps can be handled in a different order or simultaneously. Steps can also be omitted unless otherwise stated. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A tendon for use on a balloon envelope, the tendon comprising:
    first and second end portions and a main body portion disposed between the first and second end portions, each of the first end portion, the second end portion and the main body portion being comprised of a plurality of weft and warp fibers disposed as webbing;
    wherein an elasticity of the main body portion is adjusted by configuring the weft fibers along a particular weft path so as to be spaced apart in the main body portion at a certain distance from each other that is different than a spacing of the weft fibers in the first and second end portions.

2. The tendon of claim 1, wherein the first and second end portions are configured to be secured to a given portion of the balloon envelope.

3. The tendon of claim 2, further comprising a bar tack device attached to each end portion of the first and second end portions, the bar tack device being secured to the given portion of the balloon envelope.

4. The tendon of claim 1, wherein the main body portion is configured to loop over the balloon envelope along an axis thereof in order to support a load caused by inflation of the balloon envelope.

5. The tendon of claim 1, wherein the plurality of warp fibers extend longitudinally through the webbing and the weft fibers extend threadedly from side to side through one or more of the warp fibers.

6. The tendon of claim 5, wherein spacing of the weft fibers in the main body portion is within a range between 1 ppi to 5 ppi.

7. The tendon of claim 6, wherein spacing of the weft fibers in the first and second end portions is within a range between 10 ppi to 20 ppi.

8. A system, comprising:
    a balloon having a balloon envelope; and
    a plurality of tendons attached to the balloon envelope, each tendon, comprising:
        first and second end portions and a main body portion disposed between the first and second end portions, each of the first end portion, the second end portion and the main body portion being comprised of a plurality of weft and warp fibers disposed as webbing;
        wherein an elasticity of the main body portion is adjusted by configuring the weft fibers along a particular weft path so as to be spaced apart in the main body portion at a certain distance from each other that is different than a spacing of the weft fibers in the first and second end portions.

9. The tendon of claim 8, wherein the first and second end portions are configured to be secured to a given portion of the balloon envelope.

10. The tendon of claim 9, further comprising a bar tack device attached to each end portion of the first and second end portions, the bar tack device being secured to the given portion of the balloon envelope.

11. The tendon of claim 8, wherein the main body portion is configured to loop over the balloon envelope along an axis thereof in order to support a load caused by inflation of the balloon envelope.

12. The tendon of claim 8, wherein the plurality of warp fibers extend longitudinally through the webbing and the weft fibers extend threadedly from side to side through one or more of the warp fibers.

13. The tendon of claim 12, wherein spacing of the weft fibers in the main body portion is within a range between 1 ppi to 5 ppi.

14. The tendon of claim 13, wherein spacing of the weft fibers in the first and second end portions is within a range between 10 ppi to 20 ppi.

15. A method of manufacturing a tendon for supporting a balloon having a balloon envelope, the tendon comprising first and second end portions, a main body portion disposed between the first and second end portions and a plurality of weft and warp fibers disposed as a webbing, the method comprising:
  receiving the weft and warp fibers at a manufacturing device, the warp fibers extending longitudinally through the webbing;
  feeding, using the manufacturing device, the weft fibers threadedly from side to side through one or more of the warp fibers, the weft fibers are feed at a adjustable uptake rate along a particular weft path; and
  adjusting the uptake rate for the feeding in order to configure an elasticity of the main body portion of the webbing, the weft fibers in the main body portion being spaced apart at a certain distance from each other that is different than a spacing of the weft fibers in the first and second end portions based on the adjustments.

16. The method of manufacturing of claim 15, wherein the first and second end portions are configured to be secured to a given portion of the balloon envelope.

17. The method of manufacturing of claim 16, further comprising attaching a bar tack device to each end portion of the first and second end portions, the bar tack device being secured to the given portion of the balloon envelope.

18. The method of manufacturing of claim 15, wherein the main body portion is configured to loop over the balloon envelope along an axis thereof in order to support a load caused by inflation of the balloon envelope.

19. The method of manufacturing of claim 18, wherein adjusting comprises increasing the uptake rate for the feeding so that the spacing of the weft fibers in the main body portion is within a range between 1 ppi to 5 ppi.

20. The method of manufacturing of claim 19, wherein adjusting comprises increasing the uptake rate for the feeding so that the spacing of the weft fibers in the first and second end portions is within a range between 10 ppi to 20 ppi.

* * * * *